United States Patent
Gao

(10) Patent No.: US 9,211,936 B2
(45) Date of Patent: Dec. 15, 2015

(54) CONTROL DEVICE

(71) Applicant: Shimano Inc., Sakai, Osaka (JP)

(72) Inventor: Jun Gao, Osaka (JP)

(73) Assignee: Shimano Inc., Osaka (JP)

( * ) Notice: Subject to any disclaimer, the term of this patent is extended or adjusted under 35 U.S.C. 154(b) by 3 days.

(21) Appl. No.: 14/282,060

(22) Filed: May 20, 2014

(65) Prior Publication Data

US 2014/0352478 A1    Dec. 4, 2014

(30) Foreign Application Priority Data

May 30, 2013   (JP) .................................. 2013-113831

(51) Int. Cl.
*F16C 1/10* (2006.01)
*H01H 9/06* (2006.01)
*B62J 6/00* (2006.01)
*B62L 3/02* (2006.01)
*B62M 25/08* (2006.01)
*B62K 23/06* (2006.01)

(52) U.S. Cl.
CPC . *B62L 3/02* (2013.01); *B62K 23/06* (2013.01); *B62M 25/08* (2013.01); *Y10T 74/2028* (2015.01)

(58) Field of Classification Search
CPC .......... B62L 3/02; B62K 23/06; B62M 25/08; F16H 59/105; Y10T 74/2028
USPC ................. 74/473.12, 488, 502.2; 200/61.88, 200/61.87; 701/51; 340/432

See application file for complete search history.

(56) References Cited

U.S. PATENT DOCUMENTS

| | | | |
|---|---|---|---|
| 4,174,642 A | 11/1979 | Martin et al. | |
| 7,874,229 B2 * | 1/2011 | Tetsuka | 74/502.2 |
| 8,459,143 B2 * | 6/2013 | Tetsuka | 74/502.2 |
| 8,550,942 B2 * | 10/2013 | Oda et al. | 474/81 |
| 8,655,561 B2 * | 2/2014 | Kitamura | 701/51 |
| 8,723,659 B2 * | 5/2014 | Tetsuka | 340/432 |
| 8,886,417 B2 * | 11/2014 | Jordan | 701/51 |
| 8,931,365 B2 * | 1/2015 | Fujii et al. | 74/502.2 |
| 9,056,651 B2 * | 6/2015 | Tetsuka | B62L 3/02 |
| 9,090,304 B2 * | 7/2015 | Tetsuka | B62M 25/08 |
| 2015/0259025 A1 * | 9/2015 | Sala | B62K 23/06 74/473.12 |

FOREIGN PATENT DOCUMENTS

JP    2008-168751 A    7/2008

* cited by examiner

*Primary Examiner* — Adam D Rogers
(74) *Attorney, Agent, or Firm* — Global IP Counselors, LLP

(57) ABSTRACT

A control device is configured to be installed on a handlebar of a bicycle and configured to operate a brake device on the bicycle. The control device basically includes a bicycle attachment member, a brake operating member and at least one of a wireless communication unit and a notification unit. The brake operating member is pivotally coupled to the attachment member to pivot about a first axis. The least one of the wireless communication unit and the notification unit is disposed on the brake operating member.

51 Claims, 7 Drawing Sheets

CONTROL DEVICE

CROSS-REFERENCE TO RELATED APPLICATIONS

This application claims priority to Japanese Patent Application No. 2013-113831, filed on May 30, 2013. The entire disclosure of Japanese Patent Application No. 2013-113831 is hereby incorporated herein by reference.

BACKGROUND

1. Field of the Invention

This invention generally relates to a control device. More specifically, the present invention relates to a bicycle control device that is installable on a bicycle handlebar for controlling a brake device on a bicycle.

2. Background Information

Conventional bicycle control devices are known that are capable of controlling a brake device and a gear shift device. (Refer to, for example, Japanese Laid-Open Patent Publication No. 2008-168751). These conventional control devices may have an attachment member capable of being attached to the handlebar, and a brake operating member that may be disposed on the attachment member to move in a given operating direction to actuate the brake device. Further a gear shift operating member may be disposed on the brake operating member. In the conventional control device, the gear shift operating member makes it possible to actuate an electrically-driven gear shift device; additionally, the gear shift operating member includes a switch that can control the output of an electrical signal.

SUMMARY

It is desired is to provide the control device with a wireless communication unit for communication with other equipment, or a notification unit for alerting the rider of certain information. However, providing a wireless communication unit or a notification unit in the attachment member will increase the size of the attachment member. More specifically, if the control device is configured so that the rider can grip the attachment member, it is desired to be able to provide the wireless communication unit or the notification unit without increasing the size of the attachment member.

The present invention addresses the problem of providing a control device having a wireless communication unit or a notification unit without increasing the size of the attachment member.

A control device according to the present invention is installable on a bicycle handlebar and controls the brake device on the bicycle. The control device is provided with a bicycle attachment member, a brake operating member, and at least one of a wireless communication unit and a notification unit. The brake operating member is pivotally coupled to the attachment member to pivot about a first axis. The least one of the wireless communication unit and the notification unit is disposed on the brake operating member.

Therefore, in the control device, at least one of the wireless communication unit and the notification unit are not disposed on the attachment member but may be disposed on the brake operating member. Hereby it is possible to provide a wireless communication unit or a notification unit without increasing the size of the attachment member.

The attachment member preferably includes a grip section for a rider to grip. This allows a wireless communication unit or a notification unit to be provided without increasing the size of the attachment member and thereby prevents the worsening of the operative feel for the rider.

The control device preferably further includes a gear shift operating member configured to operate a gear shift device. This allows both the brake device and the gear shift device to be actuated with a single control device.

The gear shift operating member is preferably disposed on the brake operating member. In this case, providing the gear shift operating member on the brake operating member therefore allows for easy access to both operating members.

The gear shift operating member is preferably pivotally mounted about a second axis which differs from the first axis. In this case, the brake operating member pivots about a different axis than that of the gear shift operating member; therefore it is possible to differentiate the feel of operating the brake device from that of operating the gear shift device.

The gear shift operating member preferably also includes a first operating member that operates the gear shift device in a first gear shift direction, and a second operating member that operates the gear shift device in a second gear shift direction which differs from the first gear shift direction. In this case, it is possible to distinguish engaging in a first gear shift direction (for example, one of either upshifting or downshifting) versus engaging in a second gear shift direction (for example, the other of either upshifting or downshifting).

At least one of the first and second operating members is preferably arranged to pivot about a second axis which differs from the first axis. In this case, it is possible to differentiate the feel of the brake operation from that of the feel of the gear shift operation.

The first and second operating members are each preferably pivotally mounted about the second axis. In this case, it is possible to further clearly differentiate the feel of the brake operation from that of the feel of the gear shift operation.

A wireless communication unit is preferably disposed inwardly, rearwardly, or in both ways on the brake operating device when the control device is attached to the handlebar. To initiate a brake operation with the brake operating member, the rider usually holds and squeezes the front-facing portion of the brake operating member, causing the brake operating member to move rearward. The wireless communication unit may thus be provided on that normally unused region of the brake operating member to therefore prevent the rider from touching wireless communication unit and feeling discomfort because of it. Furthermore, the performance of the wireless communication unit will tend not to be impeded even if the wireless communication unit is disposed on the brake operating member.

A notification unit is preferably disposed inwardly, rearwardly, or in both ways on the brake operating device when the control device is attached to the handlebar. To initiate a brake operation with the brake operating member, the rider usually holds and squeezes the front-facing portion of the brake operating member, causing the brake operating member to move rearward. The notification unit may thus be disposed on that normally unused region of the brake operating member to therefore prevent the rider from touching the notification unit and feeling discomfort because of it.

At least one of a wireless communication unit or a notification unit is preferably disposed inwardly, rearwardly, or in both ways on the brake operating device when the control device is attached to the handlebar. To initiate a brake operation with the brake operating member, the rider usually holds and squeezes the front-facing portion of the brake operating member, causing the brake operating member to move rearward. The wireless communication unit and the notification unit may thus be disposed on that normally unused region of the brake operating member to therefore prevent the rider from touching the wireless communication unit and feeling discomfort because of it.

An add-on component is preferably disposed along with a notification unit on the brake operating member. This makes it less likely that the add-on component will be operated during normal usage of the brake operating member, and thereby allows the rider to use the add-on component to intentionally perform a special operation separate from the braking operation and the gear shifting operation.

A power supply housing is preferably also provided for accommodating a replaceable or rechargeable battery that supplies power to the wireless communication unit. In this case, it is possible to supply power to the wireless communication unit.

The power supply housing may be disposed on the brake operating member. This allows the wireless communication unit and the power supply housing to be disposed on the same brake operating member, thereby simplifying the wiring between the wireless communication unit and the power supply housing.

The notification unit includes an indicator lamp such as a light emitting diode capable of changing the manner of light emission in accordance with the electrical state of the bicycle. This facilitates visual recognition of the electrical state of the bicycle.

The gear shift operating member is preferably connected to the wireless communication unit. The wireless communication unit outputs a signal used for controlling the gear shift device in accordance with the input to the gear shift operating member. This removes the need for wiring between the gear shift operating member and the gear shift device, and simplifies the electrical wiring.

The wireless communication unit is preferably detachably mounted on the brake operating member so as to be detachable. This allows selective usage of the wireless communication function.

The notification unit is preferably detachably mounted on the brake operating member so as to be detachable. This allows selective usage of the notification function.

The wireless communication unit and the notification unit are preferably disposed on the brake operating member so as to each be detachable. This allows selective usage of the wireless communication and notification functions.

The wireless communication unit is preferably adjustably mounted on the brake operating member so as to be positionable. This allows the wireless communication unit to be placed at a location that provides good reception for communication with other equipment and where it is less likely that the rider will touch the unit.

The notification unit is preferably adjustably mounted on the brake operating member so as to be positionable. This allows the notification unit to be placed at a location where, if notifications are displayed, the notifications can be easily seen, or where, if notifications are alarms, the alarms can be easily heard. Moreover, the notification unit may be placed where it is less likely that the rider will touch the unit.

The wireless communication unit and the notification unit are preferably adjustably mounted on the brake operating member so as to each be positionable. This allows the wireless communication unit to be placed at a location that provides good reception for communication with other equipment. Furthermore, the notification unit may be placed at a location where, if notifications are displayed, the notifications can be easily seen, or where, if the notifications are alarms, the alarms can be easily heard. Moreover, the wireless communication unit and the notification unit may be placed where it is less likely that the rider will touch the units.

The present invention is capable of providing a control device having a wireless communication unit or notification unit without increasing the size of the attachment member. Also other objects, features, aspects and advantages of the disclosed control device will become apparent to those skilled in the art from the following detailed description, which, taken in conjunction with the annexed drawings, discloses illustrative embodiments of the control device.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

Figure 1:
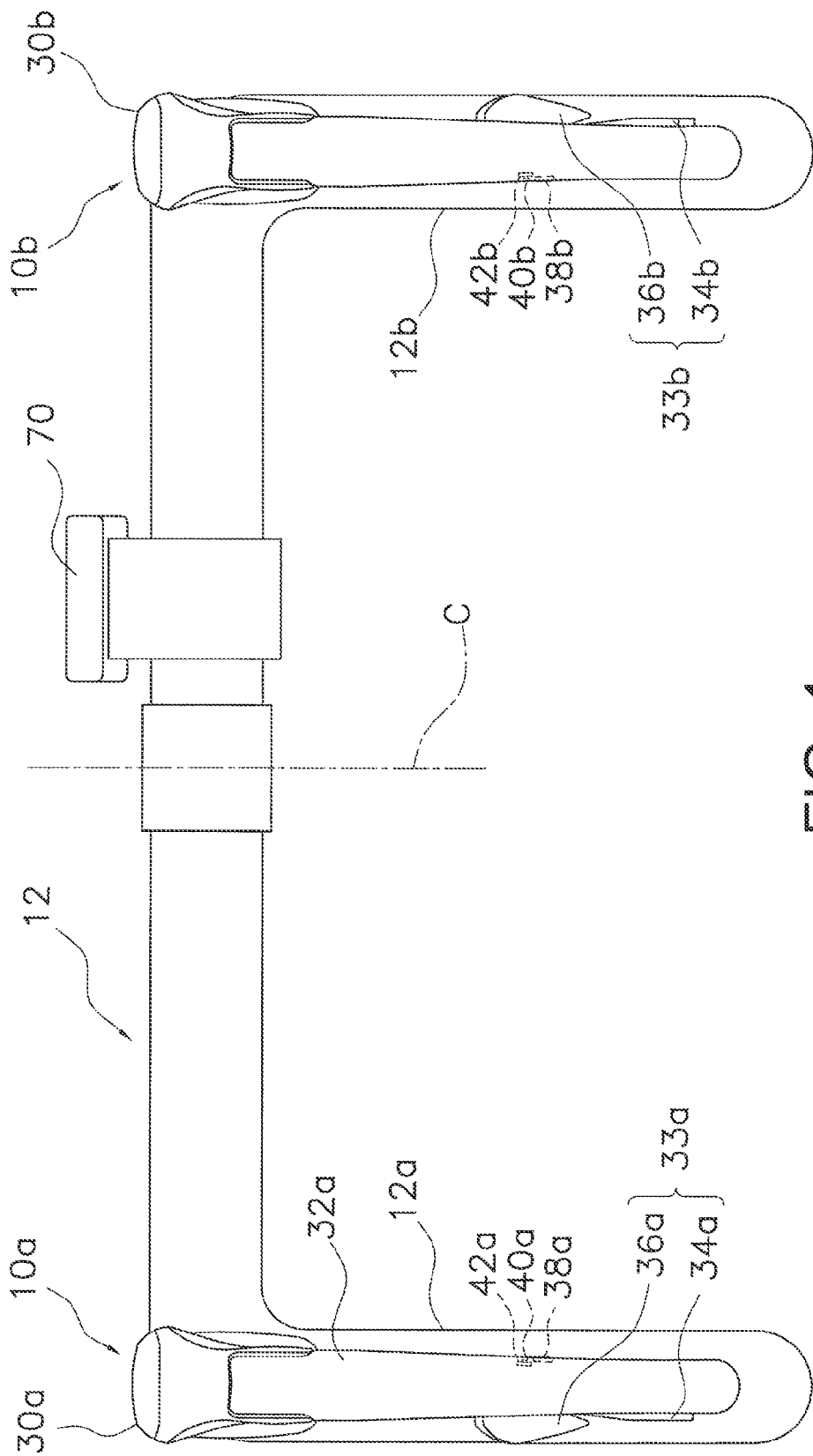
FIG. 1 is a front elevational view of a bicycle handlebar area that is equipped with a pair of control devices in accordance with one illustrated embodiment.
Figure 2:
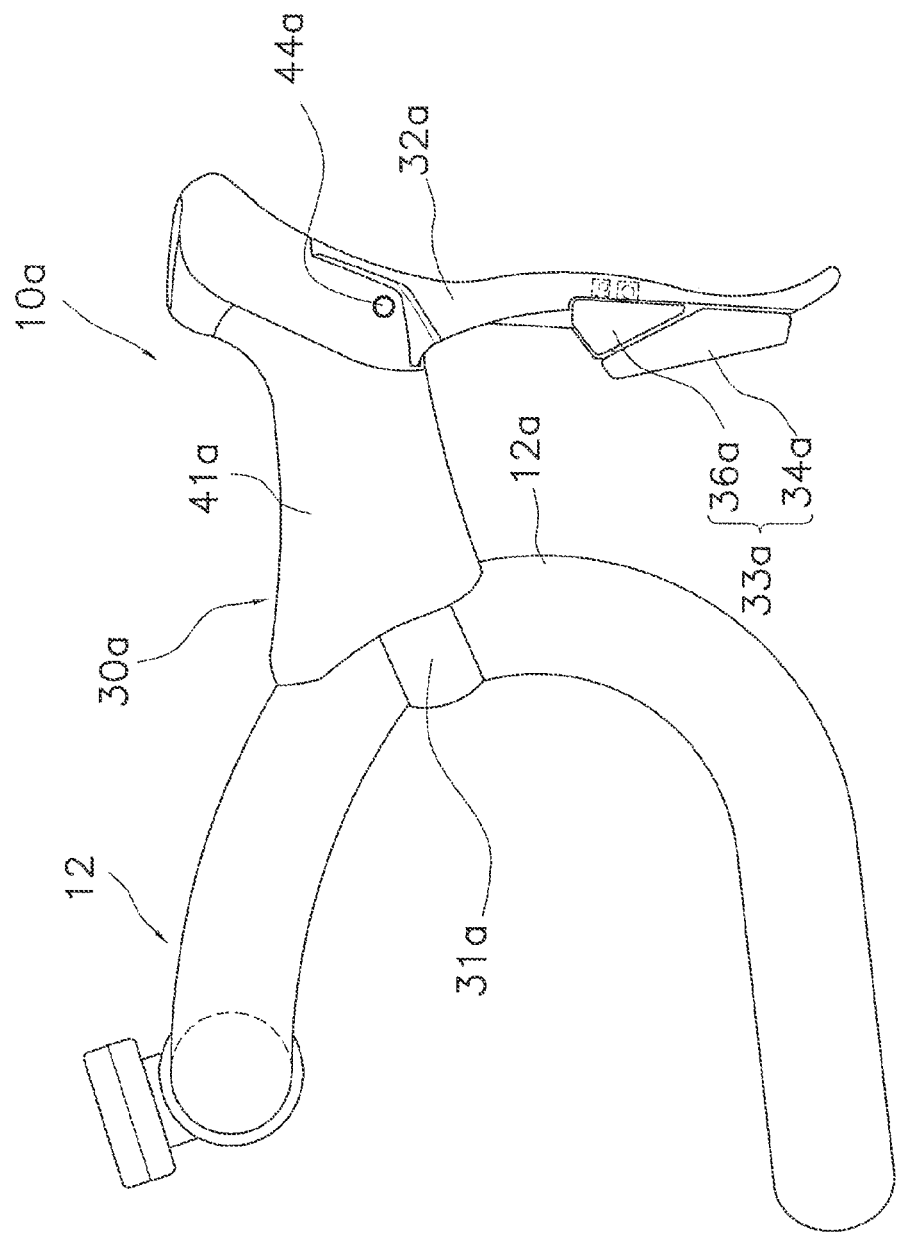
FIG. 2 is a left side elevational view of the control device installed on the handlebar illustrated in FIG. 1.

Referring initially to FIG. 1, a pair of control devices 10a and 10b of a first embodiment are installed on a bicycle handlebar 12 of a bicycle. As shown in FIGS. 1 and 2, the handlebar 12 is a so called drop handlebar. With this type of handlebar 12, the control devices 10a and 10b are installed at each of both ends of the handlebar 12 on curved portions which curve forward and then downward. Here "up", "down", "left", and "right" signify up, down, left and right when a rider (person operating the bicycle) is seated in a saddle (not shown) facing the handlebar 12 with the control devices 10a and 10b installed. Additionally, "inward" as used herein refers to a direction from each end of the handlebar 12 towards a central plane C (refer to FIG. 1) that extends vertically through the center of the handlebar 12. The control devices 10a and 10b are capable of controlling the brake device (not shown) and electrically-driven gear shift device (not shown) on the bicycle. The gear shift device is capable of operating in a plurality of control modes which include an adjustment mode. Here, if the gear shift device is an external gear shift device that includes a chain-guide, the adjustment mode allows adjustment of the chain-guide to a plurality of positions established in accordance with a plurality of gears (a plurality of rear sprockets or front chain rings).

Given that the control devices 10a and 10b are configured as mirror images of each other, the explanation that follows will focus mainly on the control device 10a which is placed on the right side of the handlebar 12. The parts in the control device 10b are illustrated in FIG. 1, substituting 'a' with 'b' for the parts in the control device 10a.

Figure 3:
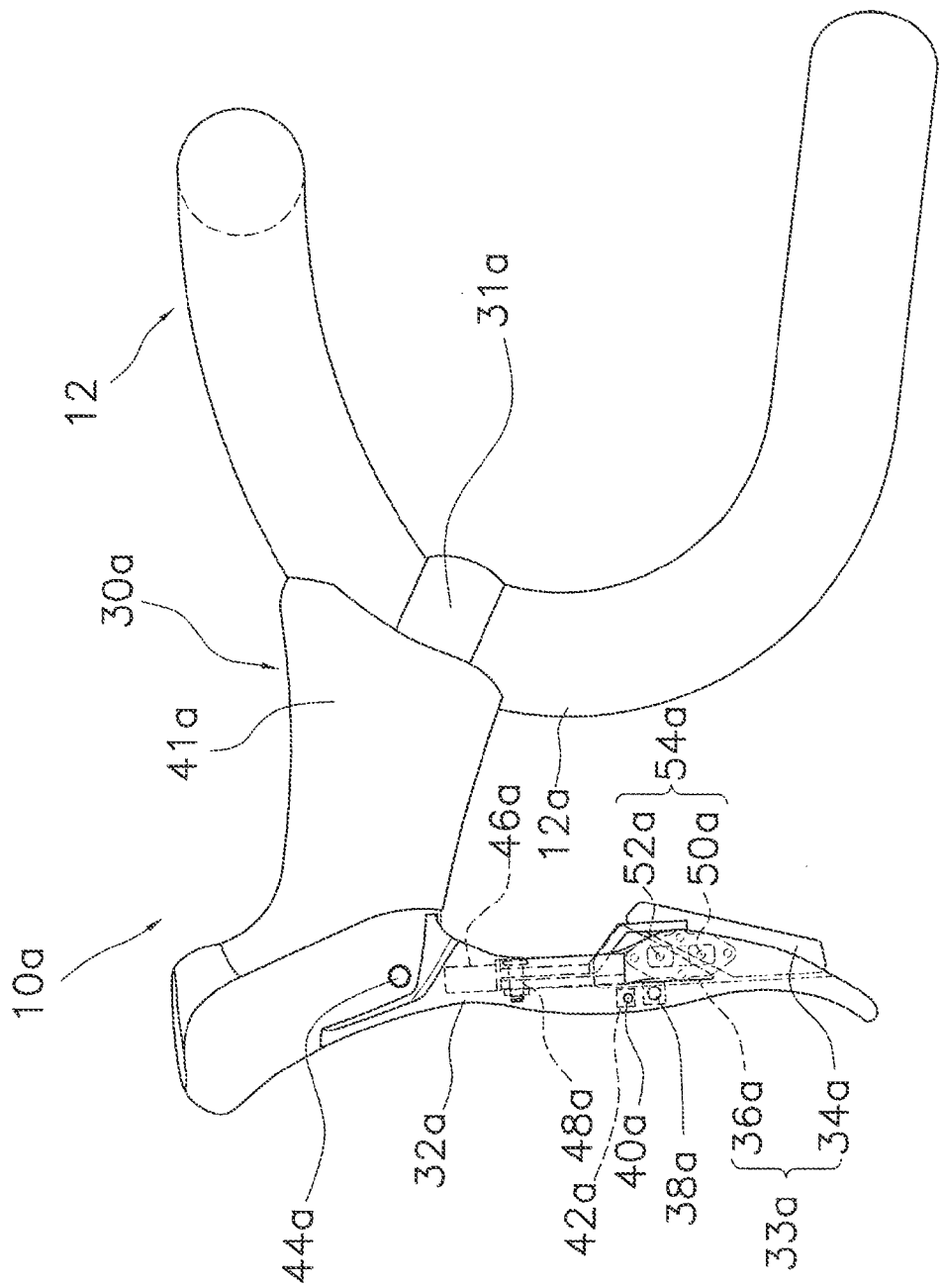
FIG. 3 is a right side elevational view of the control device installed on a handlebar illustrated in FIG. 1.
Figure 4:
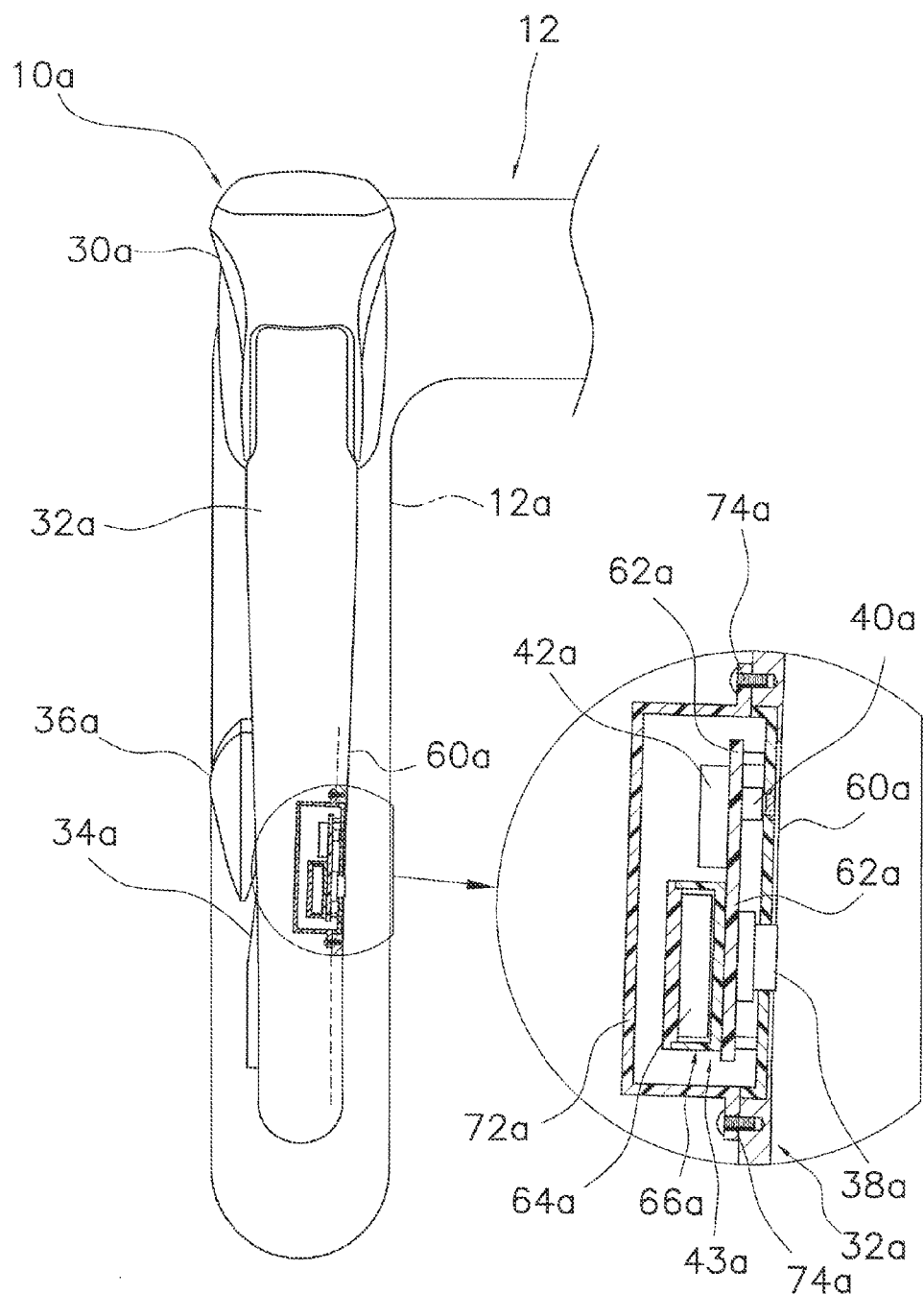
FIG. 4 is a front elevational view of one of the control devices illustrated in FIG. 1 with an enlarged portion showing the gear shift operating member in cross section.

As shown in FIG. 2, the control device 10a is provided with a bicycle attachment member 30a, a brake operating member 32a and a gear shift operating member 33a. The gear shift operating member 33a includes a first operating member 34a and a second operating member 36a. Additionally, as shown in FIGS. 3 and 4, the control device 10a is further provided with an add-on component 38a, a notification unit 40a, a wireless communication unit 42a and a power supply housing 43a. The notification unit 40a reports the electrical state of the bicycle. The wireless communication unit 42a communicates with electrical components on the bicycle capable of wireless communication.

As shown in FIG. 1, a cycle computer 70 is one example of an electrical component that would be capable of communicating wirelessly with the wireless communication unit 42a. Moreover, the electrical components capable of communicating wirelessly are not limited to the cycle computer 70 and can include a rider-installed heart rate sensor, a gear sensor provided in the control device 10a and which detects the shift gear, or a speed sensor or cadence sensor which detects the revolutions of the crank arm and are disposed on the bicycle. The electrical components further include, for example, an electrically-driven gear shift device (for instance, a front or rear derailleur).

The bicycle attachment member 30a is attachable to the handlebar 12 of the bicycle. In particular, the bicycle attachment member 30a can be installed on a curved section 12a of the handlebar 12 by a band 31a. There are many ways the band 31a can be used to place the attachment member 30a on the handlebar 12, and therefore such descriptions will be omitted here. Between the front and rear ends of the attachment member 30a is a grip section 41a that the rider can grip. The attachment member 30a is provided with a first shaft 44a which, in effect, extends from left to right at the front end section of the attachment member 30a. The first shaft 44a defines a first (pivot) axis.

The brake operating member 32a is pivotally mounted on the first shaft 44a to be able to pivot freely and thereby operate the brake device. In other words, the brake operating member 32a can be provided to pivot about the first shaft 44a. The brake operating member 32a is a brake lever that pivots about the first shaft 44a. The brake operating member 32a is connected to one end of a Bowden cable (not shown). The other end of the cable is connected to a brake device. A biasing member such as a spring (not shown) biases the brake operating member 32a toward the front (anti-clockwise with respect to the first shaft 44a shown in FIG. 2), so that the brake operating member 32a is in a first initial position shown in FIG. 2. Therefore, the brake operating member 32a is configured so that pressing the front-facing surface of the brake operating member 32a toward the rear (rearward) operates the brake device to in turn reduce the speed of the bicycle. That is, pressing the front-facing surface of the brake operating member 32a rearward causes a braking operation.

Figure 5:
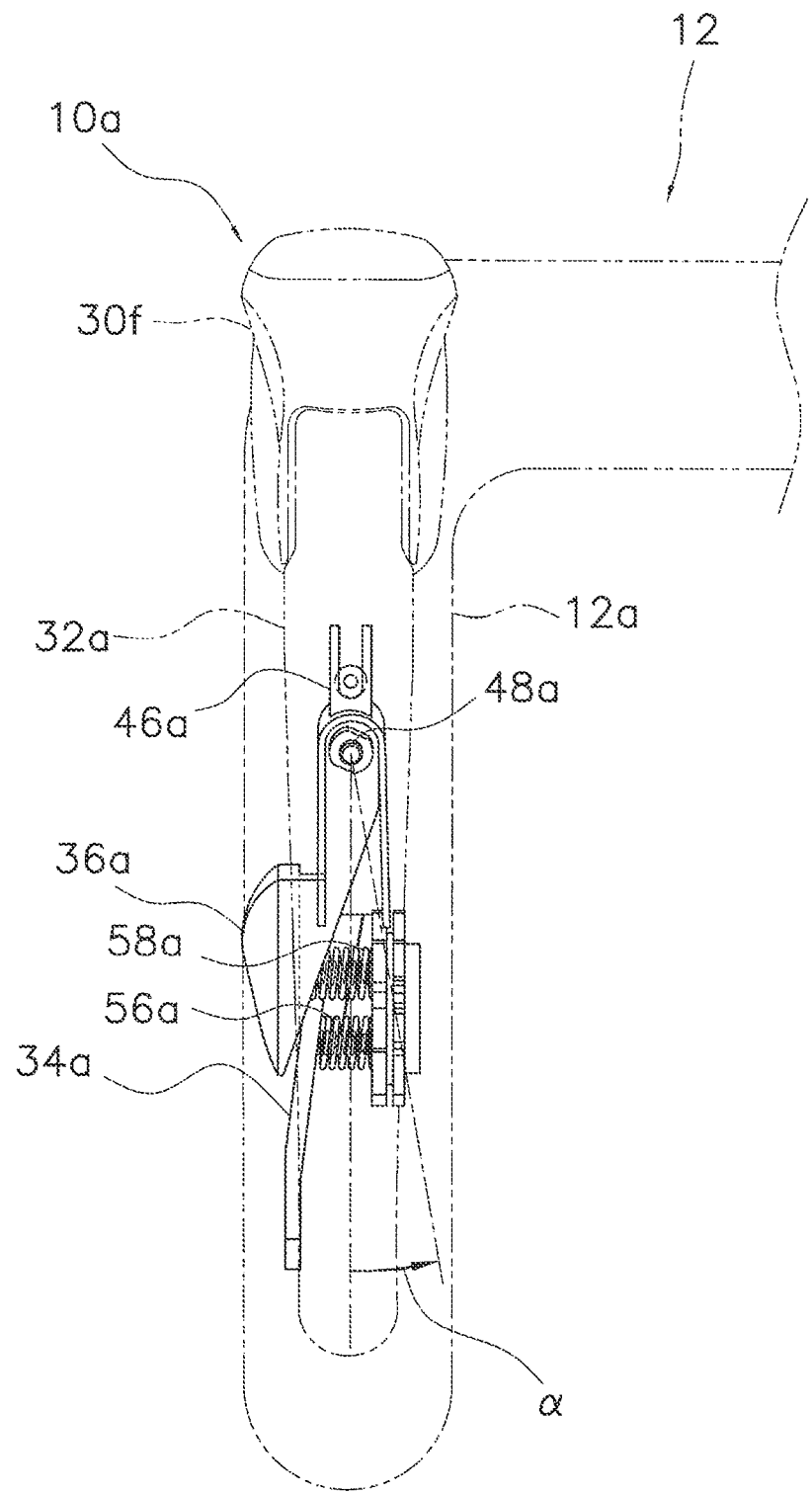
FIG. 5 is a front view elevational view of the control device illustrated in FIG. 4 showing two gear shift operating members.

As shown in FIGS. 3 and 5, the brake operating member 32a has a support member 46a which pivotally supports first and second operating members 34a and 36a. The support member 46a is fixed to the rear surface of the brake operating member 32a. The support member 46a is provided with a second shaft 48a which generally extends from the front to the rear thereof. The second shaft 48a defines a second (pivot) axis. Furthermore, the support member 46a is provided with a sensor unit 54a having a first switch 50a and a second switch 52a. The first and second switches 50a and 52a can be, for example, normally open push switches. The sensor unit 54a outputs a first signal or a second signal in accordance with the output from the first switch 50a and the second switch 52a. Additionally the first and second switches 50a and 52a can be normally closed switches; or, one switch can be a normally open switch while the other is a normally closed switch. Moreover, the support member 46 can be omitted while the second shaft 48a and the sensor unit 54a are disposed directly on the brake operating member 32a.

The first and second operating members 34a and 36a are respectively provided to electrically-operate the gear shift device. The first and second operating members 34a and 36a are each capable of pivoting about the second shaft 48a. The second operating member 36a is disposed further forward than the first operating member 34a, and is disposed so as to pivot freely about the second shaft 48a of the support member 46a. The first operating member 34a extends farther downward than the second operating member 36a. As shown in FIG. 5, the first and second operating members 34a and 36a can pivot inwardly about the second shaft 48a from a second initial position by the amount shown by the arrow α. Here, when the second operating member 36a is operated, the second operating member 36a presses the first operating member 34a, and the first operating member also pivots. However, when the first operating member 34a is operated, only the first operating member 34a pivots. Biasing members 56a and 58a (refer to FIG. 5) force the first and second operating members 34a and 36a respectively toward the second initial position (refer to FIG. 5) which is away from the central plane (clockwise with respect to the second shaft 48a shown in FIG. 5). The biasing members 56a and 58a are two coil springs having different spring diameters, and function to improve the operational feel of pressing the first switch 50a and the second switch 52a. Further, the first and second operating members 34a and 36a return to the second initial position after operation. Pressing the outer surface of the first and second operating members 34a and 36a inward (anti-clockwise with respect to the second shaft 48a in FIG. 5) towards the central plane C actuates the gear shift device. Namely, pressing the first and second operating members 34a and 36a inward toward the central plane C causes a gear shift.

Pressing the first operating member 34a, for example, activates the first switch 50a that is disposed at the lower end of the support member 46a, and the sensor unit 54a outputs a first signal. Pressing the second operating member 36a causes the first operating member 34a to also pivot and thereby, for example, activates both the first and second switches 50a and 52a, and the sensor unit outputs a second signal. One of the first signal and the second signal is supplied to the gear shift device, and used, for example, as the upshift signal. The other of the first signal and the second signal is supplied to the gear shift device, and used, for example, as the downshift signal. In other words, the first and second operating members 34a and 36a are provided for electrically-operating the electrically-driven gear shift device.

An add-on component 38a can be provided to control an operation different from the braking operation actuated by the brake operating member 32a, and the gear shifting operation actuated by first and second operating members 34a and 36a. As shown in FIG. 4, when the control device 10a is installed on the handlebar 12, the add-on component 38a can be disposed inwardly facing part on the brake operating member 32a. Therefore, the add-on component 38a is operated from the inner surface 60a (the inward facing surface) of the brake operating member 32a. The add-on component 38a can include, for example, a push switch. The operative part of the add-on component 38a that will be pressed protrudes slightly from the inner surface 60a of the brake operating member 32a.

The add-on component 38a can be provided for switching between a plurality of control modes of the gear shift device. For example, pressing the add-on component 38a for more than a predetermined amount of time can switch the control mode. Additionally, pressing the add-on component 38a for less than a predetermined time can allow for switching the control state within the control modes. For example, pressing the add-on component 38a for less than a predetermined time during the adjustment mode can allow modification of an adjustment amount from the standard position of the chain guide for each gear.

The notification unit 40a can be for example, an indicator lamp such as a light emitting diode that capable of changing the manner of light emission in accordance with an electrical state of the bicycle. The notification unit 40a can be provided for reporting the electrical state of the gear shift device for a control mode. The notification unit 40a causes a variation in the way light is emitted, for example, turning on, turning off, or varying how the light is flashing to report whether or not the gear shift device is in adjustment mode. The notification unit 40a can be installed on a same circuit board 62a housing the add-on component 38a and the wireless communication unit 42a. Therefore the notification unit 40a, along with the add-on component 38a, and the wireless communication unit 42a can be integrally provided on inwardly facing part of the brake operating member 32a.

The wireless communication unit 42a has a communication-enabled semiconductor integrated circuit, and wirelessly transmits data on the gear selected by the gear shift operating member 33a to the cycle computer 70. The wireless communication unit wirelessly transmits the first and second signals from the sensor unit 54a to the electrically-driven gear shift device.

A power supply housing 43a has a battery case 66a which is capable of housing a replaceable battery, such as a coin battery 64a. The battery case 66a is covered by a removable lid 68a which makes the case liquid tight.

The add-on component 38a, the notification unit 40a, the wireless communication unit 42a, the circuit board 62a, and the power supply housing 43a can be stored in a detachable case member 72a on the inward-facing part of the brake operating member 32a. The case member 72a can be secured the brake operating member 32a on the inner part thereof by a plurality of (for example, two) screws 74a.

For a control device configured in this manner, the wireless communication unit 42a and the notification unit 40a can be disposed on the brake operating member 32a, to thereby avoid increasing the size of the attachment member 30a.

Furthermore, providing the first and second operating members 34a and 36a of the gear shift operating member 33a to pivot about the second shaft 48a which is different from the first shaft 44 for the brake operating member 32a clearly differentiates the feel of operating the brake device from that of operating the gear shift device.

Additionally, the add-on component 38a can be disposed inwardly on the brake operating member 32a. Hereby it is possible to make it difficult for the rider to operate the add-on component 38a during normal usage of the control device, thereby reducing the tendency for the rider to confuse operation of the add-on component 38a with operation of other operating members.

Moreover, the add-on component 38a, the notification unit 40a, and the wireless communication unit 42a may be disposed on an inwardly facing part of the brake operating member 32a. The add-on component 38a, the wireless communication unit 42a, and the notification unit 40a can thus be disposed on a normally unused region of the brake operating member 32a, therefore reducing the tendency for the rider to touch the add-on component 38a, the wireless communication unit 42a, or the notification unit 40a and feel discomfort because of it.

While a selected embodiment has been discussed above to illustrate the present invention, it will be apparent to those skilled in the art from this disclosure that various changes and modifications can be made herein without departing from the scope of the invention as defined in the appended claims. In other words, the present invention is not limited to the above described embodiment and may be modified in various ways insofar as the modifications remain within the spirit and scope of the invention. More specifically, the embodiments and modification examples disclosed in this specification can be arbitrarily combined as necessary.

The above embodiment describes the gear shift device as a derailleur, which is an external gear shift device. However, the present invention may also be adapted for a control device which controls the shifting by an electrically-controllable internal hub device.

In the above mentioned embodiment the first and second operating members 34a and 36a are connected to the brake operating member 32a so as to pivot freely about the same shaft 48a. However, the present invention is not limited to this configuration. One of either the first operating member 34a or the second operating member 36a can be connected to the brake operating member 32a so as to pivot freely about the shaft 48a, while the other operating member can be connected so as to pivot about a shaft that is different from both the first shaft 44a and the second shaft 48a.

In the above mentioned embodiment, the gear shift operating member 33a is disposed on the brake operating member 32a. However, the gear shift operating member 33a can be disposed on the attachment member 18.

In the above mentioned embodiment, the gear shift operating member 33a includes the first and second operating members 34a and 36a. However, the gear shift operating member can be a single gear shift operating member. In this case, the gear shift direction can be switched by the inward and outward operation of the gear shift operating member. Alternatively, the gear shift direction can be switched by the pivot angle of the gear shift operating member.

In the above mentioned embodiment, to improve the operational feel of the overstroke, the first and second switches 50a and 52a are turned on and off by way of the biasing members 56a and 58a. However, the two switches may be configured to be turned on and off directly by the first and second operating members 34a and 36a.

In the above mentioned embodiment, an indicator lamp is employed as the notification unit, however, a device that emits sound, such as a buzzer and the like may be used as the notification unit.

In the above mentioned embodiment, the add-on component 38a, the notification unit 40a, and the wireless communication unit 42a are disposed inwardly on the brake operating member 32a. However, the present invention is not limited to this configuration. For example, the add-on component 38a, the notification unit 40a, and the wireless communication unit 42a can be disposed rearwardly on the brake operating member or the gear shift operating member. Additionally, the add-on component 38a can be disposed inwardly and slanting rearward on the brake operating member 32*a* or the gear shift operating member 33*a*. Finally, either one of only the notification unit or the wireless communication unit can be further disposed on the brake operating member 32*a*.

Figure 6:
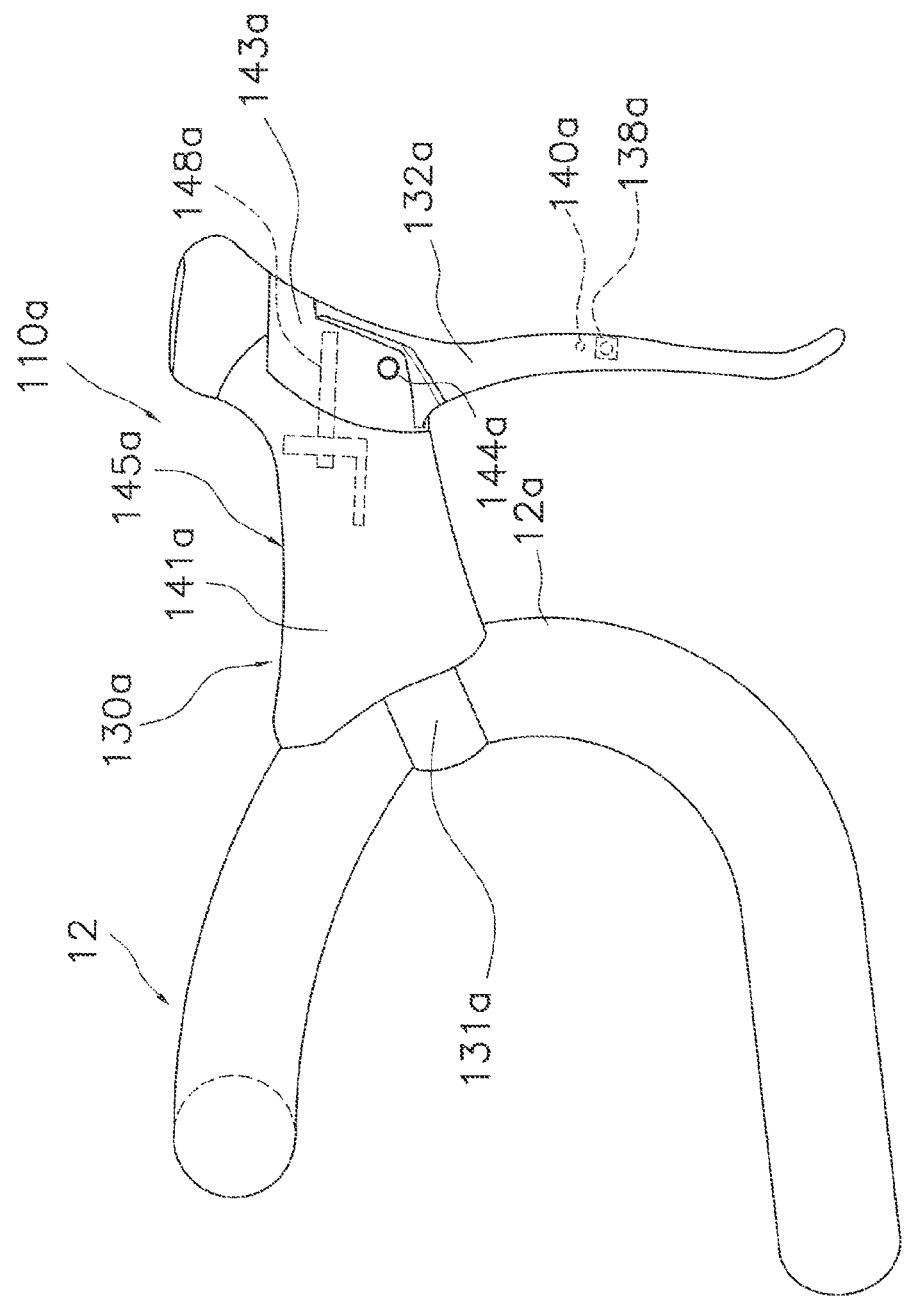
FIG. 6 is a left side elevational view, similar to FIG. 2, of a control device in accordance with another embodiment.

In the above mentioned embodiment, the brake operating member 32*a* is used for initiating braking, and the gear shift operating member 33*a* is used for initiating gear shifting. However, the present invention is not limited to this configuration. The control device can be configured in the same manner as the control device 110*a* shown in FIG. 6. The control device 110*a* includes a bicycle attachment member 130*a*, a brake operating member 132*a*, an add-on component 138*a* and a notification unit 140*a*.

The bicycle attachment member 130*a* has first and second members 143*a* and 145*a*. The first member 143*a* has a first shaft 144*a*. The second member 145*a* has a second shaft 148*a*. The brake operating member 132*a* can be disposed on the first member 143*a* to pivot about the first shaft 144*a*. The first member 143*a* can be disposed on the front end part of the second member 145*a* to pivot about the second shaft 148*a*. The first shaft 144*a* generally extends from left to right. The second member 143*a* can be installed on the curved section 12*a* of the handlebar 12 by a band 131*a*. Between the front and rear ends of the second member 143*a* is a grip section 141*a* that the rider can grip. The second shaft 148*a*, in effect, extends from front to rear.

The bicycle attachment member 130*a* has first and second shafts 144*a* and 148*a* and therefore the brake operating member 132*a* may be disposed on the attachment member 130*a* to pivot about the first and second shafts 144*a* and 148*a*. Thus, the brake operating member may be configured so that pressing the front-facing surface of the brake operating member 132*a* rearward operates the brake device to in turn reduce the speed of the bicycle. That is, pressing the front-facing surface of the brake operating member 132*a* rearward causes a braking operation.

Further, the brake operating member 132*a* can be configured so that operating the outward-facing surface of the brake operating member 132*a* inward causes the gear shift device to upshift (or downshift). Additionally, the brake operating member 132*a* can be configured so that operating the outward-facing surface of the brake operating member 132*a* to, for instance, a second angle which is different from a first angle causes the gear shift device to upshift (or downshift). In other words, in the control device 110*a*, the brake operating member 132*a* also functions as a gear shift operating member to initiate a gear shift. Finally, the second member 145*a* can be provided with an angle detection unit such as a rotary encoder and the like that detects the pivot angle about the second shaft 148*a* of the first member 143*a*, or an angle discrimination unit capable of discriminating between a first angle and a second angle.

The brake operating member 132*a* can be provided with the add-on component 138*a*, and the report unit 140*a* on the inward-facing surface thereof. The add-on component 138*a* and the notification unit 140*a* are configured in the same manner as the add-on component 38*a* and the notification unit 40*a* in the above mentioned embodiment. The same manner of operative effects as the above mentioned embodiment may be obtained with the configuration for control device 110*a*.

The above mentioned embodiment employs the replaceable primary battery 64*a* as the power supply. However, the present invention is not limited to this configuration. A rechargeable secondary battery or a capacitor element can be used as the power supply. Moreover, the power supply may be replaceable, or may be fixed.

Figure 7:
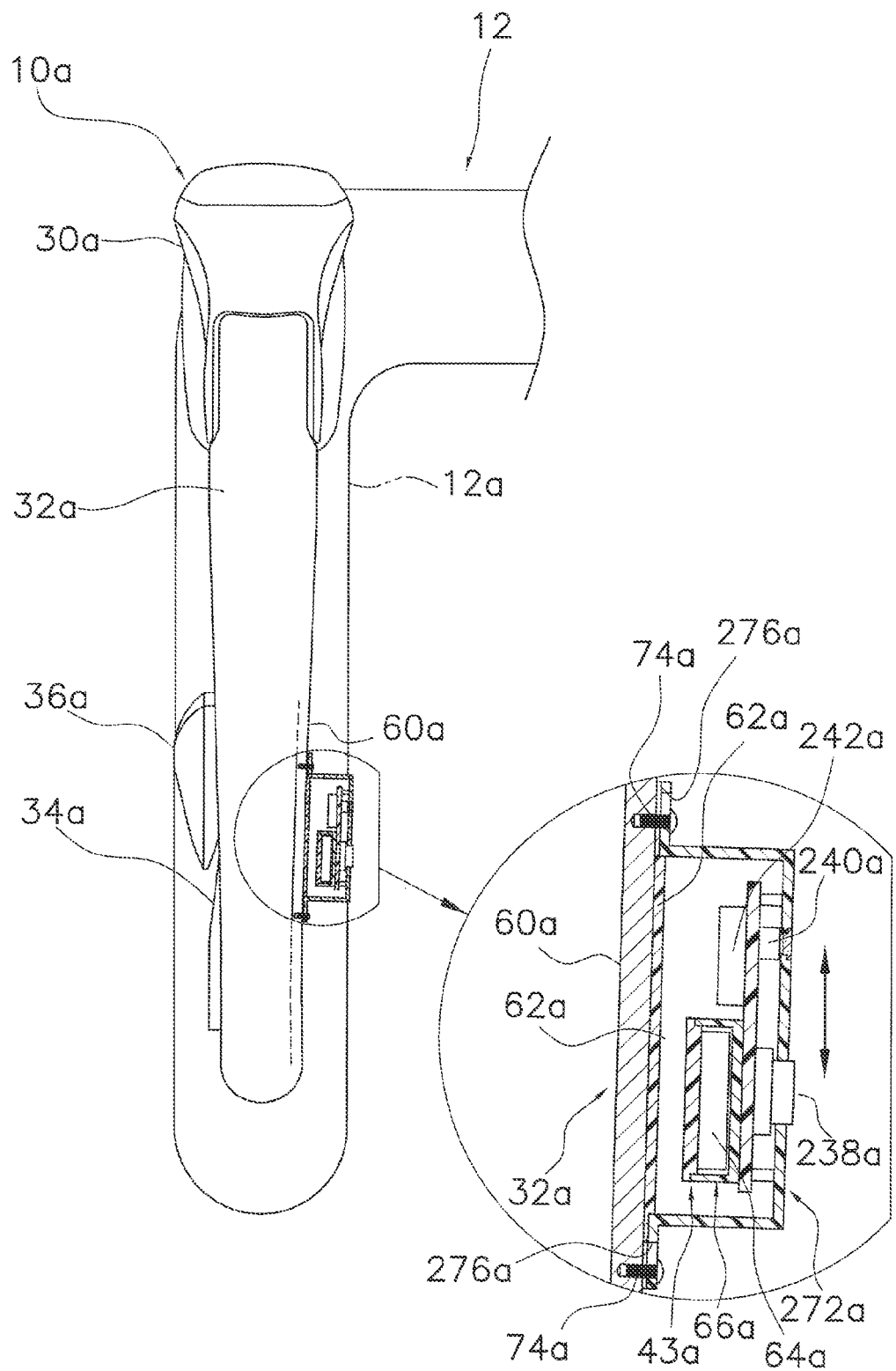
FIG. 7 is a front elevational view, similar to FIG. 4, of a control device in accordance with yet another embodiment with an enlarged portion showing the gear shift operating member in cross section.

As shown in FIG. 7, an add-on component 238*a*, a notification unit 240*a* and a wireless communication unit 242*a* are preferably disposed be disposed on the brake operating member 32*a* so as to be detachable and positionable. Here, the add-on component 238*a*, the notification unit 240*a*, and the wireless communication unit 242*a* can be disposed in a case member 272*a*, and the case may be secured to the inner surface 60*a* of the brake operating member 32*a* so as to be detachable and positionable. The case member 272*a* is formed with a plurality of elongated holes 276*a* (for example, two) for receiving the screws 74*a* therethrough. The elongated holes 276*a* preferably are formed to extend in the direction that the brake operating member 32*a* extends. Thereby, the case member 272*a* is positionable along the extending direction of the brake operating member 32*a*. Thus, position of the add-on component 238*a*, the notification unit 240*a*, and the wireless communication unit 242*a* which are stored on the inside of the case member 272*a* may also be adjusted. Moreover, the case member 272*a* may be disposed to be positionable on the rearward-facing surface of the brake operating member 32*a*. Finally, the add-on component, notification unit, and the wireless communication unit may be disposed on the brake operating member 32*a* without being stored in the case member, so as to be separately detachable, and separately positionable.

Thus, the foregoing descriptions of the embodiments according to the present invention are provided for illustration only, and not for the purpose of limiting the invention as defined by the appended claims and their equivalents.

What is claimed is:

1. A control device configured to be installed on a handlebar of a bicycle and configured to operate a brake device on the bicycle, the control device comprising:
   a bicycle attachment member;
   a brake operating member pivotally coupled to the attachment member to pivot about a first axis; and
   at least one of a wireless communication unit and a notification unit disposed on the brake operating member, the wireless communication unit being disposed on at least one of an inwardly facing part and a rearwardly facing part of the brake operating member while the control device is attached to the handlebar.

2. The control device according to claim 1, wherein the attachment member includes a grip section for a rider to grip.

3. The control device according to claim 1, further comprising a gear shift operating member configured to operate a gear shift device on the bicycle.

4. The control device according to claim 3, wherein
   the gear shift operating member is connected to the wireless communication unit; and
   the wireless communication unit outputs a signal used to control the gear shift device in accordance with an input to the gear shift operating member.

5. The control device according to claim 3, wherein
   the gear shift operating member is disposed on the brake operating member.

6. The control device according to claim 3, wherein
   the gear shift operating member is pivotally mounted about a second axis which differs from the first axis.

7. The control device according to claim 3, wherein
   the gear shift operating member includes a first operating member that operates the gear shift device in a first gear shift direction, and a second operating member that operates the gear shift device in a second gear shift direction which differs from the first gear shift direction.

8. The control device according to claim 7, wherein at least one of the first and second operating members is pivotally mounted about a second axis which differs from the first axis.

9. The control device according to claim 8, wherein the first and second operating members are each pivotally mounted about the second axis which differs from the first axis.

10. The control device according to claim 1, further comprising
a power supply housing having a replaceable or rechargeable battery accommodating part that supplies power to the wireless communication unit.

11. The control device according to claim 10, wherein the power supply housing is disposed on the brake operating member.

12. The control device according to claim 1, wherein the notification unit includes an indicator lamp in which the notification unit changes light emission of the indicator lamp in accordance with an electrical state of the bicycle.

13. The control device according to claim 1, wherein the wireless communication unit is detachably mounted on the brake operating member.

14. The control device according to claim 1, wherein the notification unit is detachably mounted on the brake operating member.

15. The control device according to claim 1, wherein the wireless communication unit and the notification unit are each detachably mounted on the brake operating member.

16. The control device according to claim 1, wherein the wireless communication unit is adjustably mounted on the brake operating member between at least two positions.

17. The control device according to claim 1, wherein the notification unit is adjustably mounted on the brake operating member between at least two positions.

18. The control device according to claim 1, wherein the wireless communication unit and the notification unit are each adjustably mounted on the brake operating member between at least two positions.

19. A control device configured to be installed on a handlebar of a bicycle and configured to operate a brake device on the bicycle, the control device comprising:
a bicycle attachment member;
a brake operating member pivotally coupled to the attachment member to pivot about a first axis; and
at least one of a wireless communication unit and a notification unit disposed on the brake operating member, the notification unit being disposed on at least one of an inwardly facing part and a rearwardly facing part of the brake operating member while the control device is attached to the handlebar.

20. The control device according to claim 19, further comprising
an add-on component provided with the notification unit on the brake operating member.

21. The control device according to claim 19, wherein the attachment member includes a grip section for a rider to grip.

22. The control device according to claim 19, further comprising
a gear shift operating member configured to operate a gear shift device on the bicycle.

23. The control device according to claim 22, wherein the gear shift operating member is connected to the wireless communication unit; and the wireless communication unit outputs a signal used to control the gear shift device in accordance with an input to the gear shift operating member.

24. The control device according to claim 22, wherein the gear shift operating member is disposed on the brake operating member.

25. The control device according to claim 22, wherein the gear shift operating member is pivotally mounted about a second axis which differs from the first axis.

26. The control device according to claim 22, wherein the gear shift operating member includes a first operating member that operates the gear shift device in a first gear shift direction, and a second operating member that operates the gear shift device in a second gear shift direction which differs from the first gear shift direction.

27. The control device according to claim 26, wherein at least one of the first and second operating members is pivotally mounted about a second axis which differs from the first axis.

28. The control device according to claim 27, wherein the first and second operating members are each pivotally mounted about the second axis which differs from the first axis.

29. The control device according to claim 19, wherein the notification unit includes an indicator lamp in which the notification unit changes light emission of the indicator lamp in accordance with an electrical state of the bicycle.

30. The control device according to claim 19, wherein the wireless communication unit is detachably mounted on the brake operating member.

31. The control device according to claim 19, wherein the notification unit is detachably mounted on the brake operating member.

32. The control device according to claim 19, wherein the wireless communication unit and the notification unit are each detachably mounted on the brake operating member.

33. The control device according to claim 19, wherein the wireless communication unit is adjustably mounted on the brake operating member between at least two positions.

34. The control device according to claim 19, wherein the notification unit is adjustably mounted on the brake operating member between at least two positions.

35. The control device according to claim 19, wherein the wireless communication unit and the notification unit are each adjustably mounted on the brake operating member between at least two positions.

36. A control device configured to be installed on a handlebar of a bicycle and configured to operate a brake device on the bicycle, the control device comprising:
a bicycle attachment member;
a brake operating member pivotally coupled to the attachment member to pivot about a first axis; and
at least one of a wireless communication unit and a notification unit disposed on the brake operating member, the wireless communication unit and notification unit each being disposed on at least one of an inwardly facing part and a rearwardly facing part of the brake operating member while the control device is attached to the handlebar.

37. The control device according to claim 36, wherein the attachment member includes a grip section for a rider to grip.

38. The control device according to claim 36, further comprising a gear shift operating member configured to operate a gear shift device on the bicycle.

39. The control device according to claim 38, wherein
the gear shift operating member is connected to the wireless communication unit; and
the wireless communication unit outputs a signal used to control the gear shift device in accordance with an input to the gear shift operating member.

40. The control device according to claim 38, wherein
the gear shift operating member is disposed on the brake operating member.

41. The control device according to claim 38, wherein
the gear shift operating member is pivotally mounted about a second axis which differs from the first axis.

42. The control device according to claim 38, wherein
the gear shift operating member includes a first operating member that operates the gear shift device in a first gear shift direction, and a second operating member that operates the gear shift device in a second gear shift direction which differs from the first gear shift direction.

43. The control device according to claim 42, wherein
at least one of the first and second operating members is pivotally mounted about a second axis which differs from the first axis.

44. The control device according to claim 43, wherein
the first and second operating members are each pivotally mounted about the second axis which differs from the first axis.

45. The control device according to claim 36, wherein
the notification unit includes an indicator lamp in which the notification unit changes light emission of the indicator lamp in accordance with an electrical state of the bicycle.

46. The control device according to claim 36, wherein
the wireless communication unit is detachably mounted on the brake operating member.

47. The control device according to claim 36, wherein
the notification unit is detachably mounted on the brake operating member.

48. The control device according to claim 36, wherein
the wireless communication unit and the notification unit are each detachably mounted on the brake operating member.

49. The control device according to claim 36, wherein
the wireless communication unit is adjustably mounted on the brake operating member between at least two positions.

50. The control device according to claim 36, wherein
the notification unit is adjustably mounted on the brake operating member between at least two positions.

51. The control device according to claim 36, wherein
the wireless communication unit and the notification unit are each adjustably mounted on the brake operating member between at least two positions.

* * * * *